United States Patent

[11] 3,597,011

| [72] | Inventor | Stanley Clifford |
| | | Mount Nod, Coventry, England |
| [21] | Appl. No. | 824,200 |
| [22] | Filed | May 13, 1969 |
| [45] | Patented | Aug. 3, 1971 |
| [73] | Assignee | Girling Limited |
| | | Birmingham, England |
| [32] | Priority | May 22, 1968 |
| [33] | | Great Britain |
| [31] | | 24402/68 |

[54] SENSING CIRCUIT FOR USE IN VEHICLE BRAKING SYSTEMS
6 Claims, 2 Drawing Figs.

[52] U.S. Cl............................................. 303/21, 303/20
[51] Int. Cl............................................. B60t 8/08
[50] Field of Search........................................ 303/20, 21

[56] References Cited
UNITED STATES PATENTS

| 3,026,148 | 3/1962 | Ruof.............................. | 303/21 BE |
| 3,245,727 | 4/1966 | Anderson et al.............. | 303/21 (A4) |

*Primary Examiner*—Duane A. Reger
*Attorney*—Holman & Stern

ABSTRACT: In a vehicle braking system means is provided for sensing the deceleration of a wheel, and means is also provided whereby the brakes can be released to prevent skidding. The usual arrangement is to release the brakes when the deceleration signal reaches a predetermined magnitude, but in accordance with the invention, a control circuit is used for partly releasing the brakes at a predetermined deceleration signal below the signal at which skidding will start, and then progressively releasing the brakes with increasing deceleration.

SENSING CIRCUIT FOR USE IN VEHICLE BRAKING SYSTEMS

This invention relates to sensing circuits for use in vehicle braking systems, particularly the braking systems of road vehicles.

A sensing circuit according to the invention comprises in combination a generator for producing an output signal having a magnitude dependent on the deceleration of a selected wheel, electromagnetic means for controlling the braking effort applied to the wheel, and a control circuit coupling the generator to the electromagnetic means, said control circuit initiating current flow in said electromagnetic means at a predetermined magnitude of deceleration and then increasing said current flow with increasing deceleration in a predetermined manner to reduce or prevent the risk of skidding of the wheel.

In the accompanying drawings.

Figure 1:
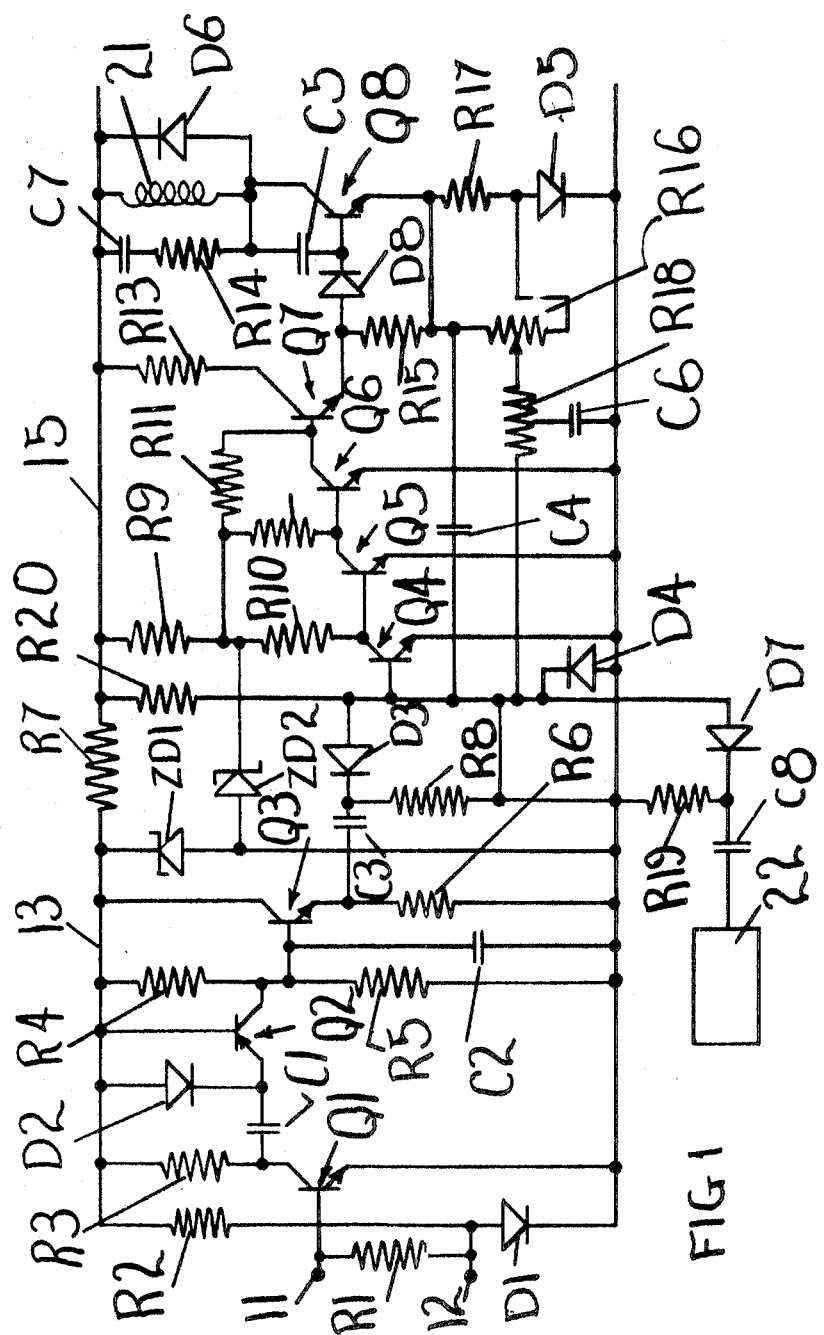
FIG. 1 is a circuit diagram illustrating one example of the invention.

Referring to FIG. 1, there is provided terminals 11 and 12 which in use are connected to a generator driven by a wheel, the deceleration of which is to be controlled. The terminal 11 is connected to the base of an NPN transistor Q1 the emitter of which is connected to a line 14, and the collector of which is connected through a resistor R3 to a supply line 13. The line 13 is connected through a resistor R7 to a supply line 15, the lines 15, 14 being connected to the positive and negative terminals respectively of a battery on a road vehicle with which the wheel is associated. The lines 13, 14 are interconnected through a resistor R2 and a diode D1 in series, and the junction of the resistor R2 and diode D1 is connected to the terminal 12.

The collector of the transistor Q1 is connected through a capacitor and the cathode-anode of a diode D2 to the line 13, the junction of the capacitor C1 and diode D2 being connected to the emitter of a PNP transistor Q2, the base of which is connected to the line 13 and the collector of which is connected to the junction of a pair of resistors R4, R5 between the lines 13, 14. The junction of the resistors R4, R5 is connected to the line 14 through a capacitor C2, and is further connected to the base of an NPN transistor Q3, the collector of which is connected to the line 13 and the emitter of which is connected to the line 14 through a resistor R6. The voltage between the lines 13, 14 is stabilized by a Zener diode ZD1 connected between the lines 13, 14.

The emitter of the transistor Q3 is further connected through a capacitor C3 and a diode D3 in series to the base of an NPN transistor Q4, the emitter of which is connected to the line 14, the base of which is connected to the line 15 through a resistor R20 and the collector of which is connected through resistor R10, R9 in series to the line 15. The junction of the resistors R9, R10 is connected to the line 14 through a Zener diode ZD2. The transistor Q4 has its collector connected to the base of an NPN transistor Q5 the emitter of which is connected to the line 14 and the collector of which is connected to the line 15 through resistors R12, R9 in series, and is further connected to the base of an NPN transistor Q6 having its emitter connected to the line 14 and its collector connected to the line 15 through resistors R11 and R9 in series. The transistors Q4, Q5 and Q6 are conveniently formed as an integrated amplifier, and the supply to this amplifier is stabilized by the Zener diode ZD2.

The collector of the transistor Q6 is connected to the base of an NPN transistor Q7, the collector of which is connected to the line 15 through a resistor R13 and the emitter of which is connected to the line 14 through a resistor R15 in series with the resistor R16 and a diode D5. A variable point on the resistor R16 is connected through a resistor R18 and resistor R8 in series to the junction of the capacitor C3 and diode D3. The junction of the resistors R18, R8 is connected to the base of the transistor Q4, and a variable point on the resistor R18 is connected to the line 14 through a capacitor C6. The emitter of the transistor Q7 is further connected through a diode D8 to the base of an NPN transistor Q8, the emitter of which is connected to the line 14 through a resistor R17 and the diode D5 in series, and the collector of which is connected to the line 15 through a solenoid 21 bridged by a diode D6, and further bridged by a resistor R14 and the capacitor C7 in series. The collector and base of the transistor Q8 are interconnected through a capacitor C5.

The generator driven by the wheel can take a variety of known forms, and is required to produce a signal, the frequency of which is proportional to the speed of rotation of the wheel. One convenient form of generator consists of a rotating permanent magnet having interdigitated steel pole pieces, together with an associated stationary pickup coil. The signal is applied to the base of the transistor Q1 which is forward biased by the diode D1, and is temperature compensated by the diode D1. The transistor Q1 produces a square wave which is applied to the diode pump circuit including the capacitor C1, the diode D2, the diode constituted by the base emitter of the transistor Q2 and the capacitor C2, so that the voltage across the capacitor C2 is proportional to the input frequency and therefore proportional to the speed of rotation of the wheel. This signal is fed through the emitter follower Q3 to the capacitor C3, which differentiates the signal and produces an input to the transistor Q4 proportional to the rate of change of rotational speed of the wheel. The diode D3 blocks signals produced during acceleration, so that the circuit deals only with deceleration.

The transistor Q4 is biased to conduction by current flowing through the resistor R20, and so in normal operation when the wheel is not decelerating the transistor Q4 is on, the transistor Q5 is off, the transistor Q6 is on, the transistor Q7 is off, and the transistor Q8 is also off so that no current flows in the solenoid 21. When a signal is received indicating deceleration of the wheel, base current is drawn from the transistor Q4 and the magnitude of the current drawn increases as the deceleration increases, until at a predetermined magnitude of deceleration the transistor Q4 is no longer provided with base current and ceases to conduct. At this stage the transistor Q5 turns on, the transistor Q6 turns off and the transistor Q7 turns on to provide base current to the transistor Q8 so that current flows in the solenoid 21. Feedback is provided from the transistor Q8 and added to the temperature dependent feedback developed by the diode D5. The combined feedback signal is applied to the transistor Q4 by way of the resistor R18, so that for a given value of deceleration above the predetermined deceleration, the circuit will assume a stable condition in which a predetermined current is flowing through the solenoid 21. The solenoid 21 is associated with the vehicle braking system in any convenient manner so that as the current flowing through the solenoid 21 increases, the braking effort will progressively be decreased. The delay provided by the capacitor C6 ensures that when the predetermined deceleration is reached, there will initially be a current flow in the solenoid 21 which is higher than the current level which will be established when the capacitor C6 has charged. This additional current overcomes stiction in the mechanical parts of the system.

It is usual in systems for preventing skidding to sense the deceleration of a wheel and then to release the brakes when this deceleration reaches a predetermined value. Such a system has the disadvantage that at decelerations close to the predetermined level, the brakes can be released and engaged a number of times so that the vehicle shudders in an extremely unpleasant manner. The arrangement as shown has the advantage that the release of the brakes is progressive. In the particular example so far described, the current flow through the solenoid 21 will be proportional to the deceleration above the predetermined level. This predetermined level is of course chosen to be below the level at which skidding might normally be expected to occur. By way of example only, a typical prior art system might release the brakes at a deceleration of 1.1g, with no control of the brakes below this figure. Using the arrangement shown, control might commence at 0.5g, and the brakes would then progressively be controlled until they were finally released at 1.1g. In the particular circuit shown, this release would be proportional, but the way in which the current flow in the solenoid 21 is controlled by the value of the deceleration will depend on the particular application, and could take a wide variety of forms. One such form which is particularly convenient in many applications is to provide proportional control of the brakes until a second level of deceleration is reached at which skidding is likely to occur, and then to release the brakes completely. Thus, again by way of example only, current flow in the solenoid may be initiated at 0.5g, and may increase proportionally to a value of about 80 ma. at a deceleration of 1.1g, and at this figure increase immediately to 400 ma., at which figure the brakes are released completely.

Figure 2:
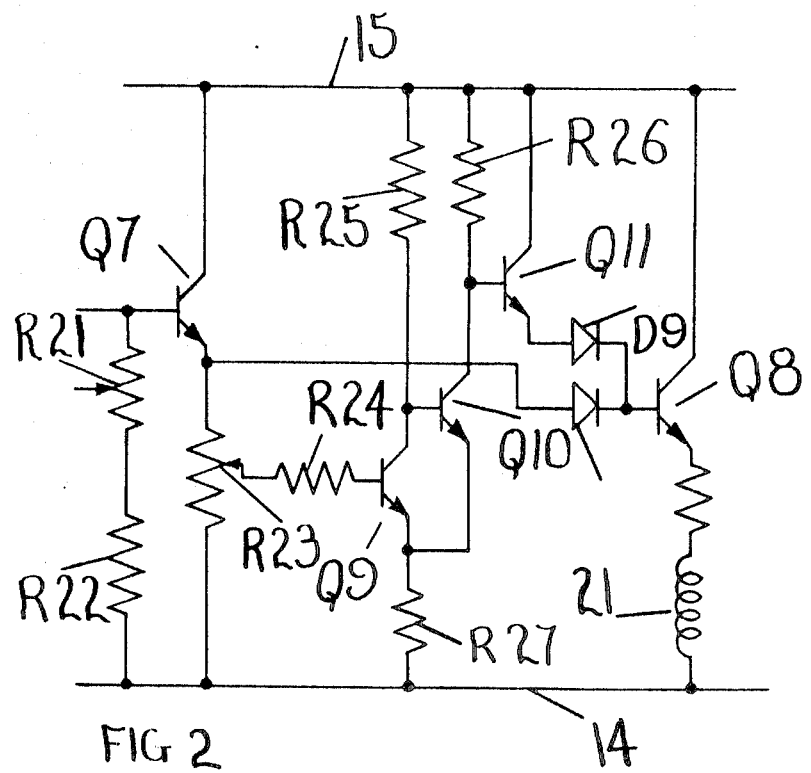
FIG. 2 is a diagram showing a modification of part of FIG. 1.

FIG. 2 shows a modification of the circuit whereby this type of control can be achieved. As compared with FIG. 1, the transistor Q7 has its emitter connected through a diode D8 to the base of the transistor Q8 as before, but the resistor R13 in the collector circuit of the transistor Q7 is not required. The solenoid 21 is now in the emitter circuit of the transistor Q8 in series with the resistor R28, with the collector of the transistor Q8 connected directly to the line 15. The feedback to the transistor Q4 is now taken from a variable point on the resistor R21 in series with the resistor R22 between the base of the transistor Q7 and the line 14, and a further resistor R23 is incorporated between the emitter of the transistor Q7 and the line 14. A variable point on the resistor R23 is connected through a resistor R24 to the base of an NPN transistor Q9 having its collector connected to the line 15 through a resistor R25 and its emitter connected to the line 14 through a resistor R27. The transistor Q9 forms with a transistor Q10 a trigger circuit of known form, the emitter of the transistor Q10 being connected to the line 14 through the resistor R27, its base being connected to the collector of the transistor Q9 and its collector being connected through a resistor R26 to the line 15, and further connected to the base of a transistor Q11 having its collector connected to the line 15 and its emitter connected through a diode D9 to the base of the transistor Q8.

The arrangement is such that before the second predetermined deceleration is reached, the transistor Q9 is off so that the transistor Q10 is on and the transistor Q11 is off. The circuit operates in the same way as in FIG. 1. However, when the predetermined deceleration, which is sensed by sensing the current flow in the resistor R23, is reached, then the transistor Q9 turns on and the transistor Q10 turns off, so that current flowing through the resistor R26 turns on the transistor Q11 and substantially increases the current flow in the transistor Q8 in the required manner. Of course, although the control between the two predetermined decelerations is linear, it need not be, and could take a variety of forms depending on the particular application.

Reverting to FIG. 1, it will be noted that the same control arrangement can be used for two wheels, a second speed circuit 22, which is the same as the circuit shown, being employed in conjunction with the capacitor C8, diode D7, diode D4 and resistor R19 to provide another input to the transistor Q4. In this case of course the arrangement is sensitive to the deceleration of the wheel which is decelerating most rapidly.

Having thus described my invention what I claim as new and desire to secure by Letters Patent is:

1. A sensing circuit for use in a vehicle braking system, comprising in combination a generator for producing an output signal having a magnitude dependent on the deceleration of a selected wheel, electromagnetic means for controlling the braking effort applied to the wheel, and a control circuit coupling the generator to the electromagnetic means, for initiating current flow in said electromagnetic means at a predetermined magnitude of deceleration and then increasing said current flow with increasing deceleration in a predetermined manner to reduce or prevent the risk of skidding of the wheel, said control circuit including an input transistor a biasing circuit for said input transistor whereby said input transistor is normally conductive, means operable by said generator for removing the bias from said input transistor with increasing deceleration so that at said predetermined deceleration the bias is completely removed from said input transistor, an output transistor said output transistor conducting when said input transistor ceases to conduct, increasing current flow through said output transistor resulting in increasing current flow through said electromagnetic means, and a feedback circuit between the output and input transistors whereby for a given deceleration the circuit assumes a stable condition in which a predetermined current flows in said electromagnetic means.

2. A sensing circuit as claimed in claim 1, including means operable when said output transistor starts to conduct for delaying the action of the feedback circuit so that for a given deceleration the current flow through the electromagnetic means will momentarily increase beyond the level at which it settles.

3. A sensing circuit as claimed in claim 1 including means whereby the current flow through the electromagnetic means is proportional to the deceleration once the predetermined deceleration has been reached.

4. A sensing circuit as claimed in claim 1, including switching means operable at a second predetermined magnitude of deceleration for increasing the current flow through said electromagnetic means substantially to release the brakes.

5. A sensing circuit as claimed in claim 4, in which said switching means is sensitive to the current flowing in said output transistor.

6. A sensing circuit as claimed in claim 4 including means whereby current flowing through the electromagnetic means between the first and second predetermined decelerations is proportional to the deceleration.